(12) United States Patent
Yun et al.

(10) Patent No.: US 7,136,415 B2
(45) Date of Patent: Nov. 14, 2006

(54) METHOD AND APPARATUS FOR MULTIPLEXING MULTI-VIEW THREE-DIMENSIONAL MOVING PICTURE

(75) Inventors: Kug Jin Yun, Taejon (KR); Suk-Hee Cho, Taejon (KR); Yun Jung Choi, Taejon (KR); Jin Hwan Lee, Taejon (KR); Young Kwon Hahm, Taejon (KR); Chieteuk Ahn, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 792 days.

(21) Appl. No.: 10/291,627

(22) Filed: Nov. 12, 2002

(65) Prior Publication Data

US 2004/0027452 A1    Feb. 12, 2004

(30) Foreign Application Priority Data

Aug. 7, 2002    (KR) .................. 10-2002-0046518

(51) Int. Cl.
*H04B 1/66*   (2006.01)

(52) U.S. Cl. .................. 375/240.26; 375/240.28; 375/240.01; 382/235; 348/48; 348/52; 348/36; 348/42; 348/47; 348/51

(58) Field of Classification Search .......... 375/240.01, 375/240.26, 240.28; 348/48, 42, 52, 51, 348/36, 47; 382/235

See application file for complete search history.

(56) References Cited

U.S. PATENT DOCUMENTS

| | | | |
|---|---|---|---|
| 6,055,012 A | * | 4/2000 | Haskell et al. ............. 348/48 |
| 6,330,281 B1 | * | 12/2001 | Mann et al. ........... 375/240.12 |
| 6,584,125 B1 | * | 6/2003 | Katto ..................... 370/537 |

FOREIGN PATENT DOCUMENTS

| | | |
|---|---|---|
| EP | 0 639 031 A2 | 2/1995 |
| KR | 2002-32954 | 5/2002 |
| WO | WO 98/41020 | 9/1998 |
| WO | WO98/41020 | 9/1998 |
| WO | WO03/045046 | 5/2003 |

* cited by examiner

*Primary Examiner*—Shawn S. An
(74) *Attorney, Agent, or Firm*—Mayer, Brown, Rowe & Maw LLP

(57) ABSTRACT

An apparatus and method for multiplexing a multi-view three-dimensional moving picture according to a user's request is disclosed. The apparatus multiplexes a multi-view three-dimensional moving pictures by receiving moving pictures and information inputted from multi-view cameras and generating multi-view encoded streams corresponding to received moving pictures and information, receiving back channel information of the user, selecting necessary multi-view encoded streams according to the back channel information and multiplexing the selected multi-view encoded streams by a frame or a field having same time information. The present invention can effectively process the multi-view three-dimensional moving picture according to the display mode and system environment requested from the user by simplifying a synchronization process.

10 Claims, 6 Drawing Sheets

METHOD AND APPARATUS FOR MULTIPLEXING MULTI-VIEW THREE-DIMENSIONAL MOVING PICTURE

FIELD OF THE INVENTION

The present invention relates to an apparatus and method for multiplexing multi-view three-dimensional moving pictures according to a user's request and a computer readable recording medium storing instructions for executing the method; and, more particularly, to an apparatus and method for multiplexing multi-view encoded streams outputted at the same time from an encoder to one stream in order to simplify a synchronization-process in the multi-view three-dimensional moving picture system.

DESCRIPTION OF RELATED ARTS

In general, a multi-view three-dimensional moving picture is a set of data containing information of images of moving object acquired at same time from multiple cameras located at different viewpoints. The multi-view three-dimensional moving picture of object can be displayed on a display device for providing a realistic view of moving object and a stereopsis of moving object to a user. The multi-view three-dimensional moving picture is used in various application fields. However, mass size of image data, which needs to be transmitted, and complexity of a synchronization-process between images has been spotlighted as disadvantages of the multi-view three-dimensional moving pictures.

The multi-view three-dimensional moving image can be displayed in various modes such as a two-dimensional display, a panorama display, a stereoscopic display and an auto-stereoscopic display and each display type requires its own data format. However, a conventional moving data processing system does not support to synchronize various data format of the multi-view three-dimensional moving picture according to the display modes.

Specially, a conventional three-dimensional moving picture processing method for the stereoscopic display mode transforms images of multiple viewpoints to single image and displays the single image at a two-dimensional image process system. In the conventional method, a multiplexing process of multi-view encoded streams is not required since only one multi-view stream is outputted from the encoder.

However, in case of processing the three-dimensional moving picture without transformation to the two-dimensional moving picture, a new image processing method has been demanded for multiplexing multiple multi-view encoded streams outputted from the encoder in order to minutely synchronize between multi-view three-dimensional moving pictures and transmitting the multiplexed streams. Moreover, it has been demanded a multiplexing method for selecting and multiplexing data required to display according to the display mode such as the two-dimensional display mode, the panorama display mode, the stereoscopic display mode and the auto-stereoscopic display mode and transmitting the multiplexed data.

However, there is no image data processing apparatus and method for providing choices of display modes to user and for performing appropriate processes of the multi-view three-dimensional moving pictures according to the user's selection of display mode.

SUMMARY OF THE INVENTION

It is, therefore, an object of the present invention to provide an apparatus and method for multiplexing a multi-view three-dimensional moving picture according to user's request and a computer readable recoding medium storing instructions for executing the method.

In accordance with an aspect of the present invention, there is provided an apparatus for multiplexing a multi-view three-dimensional moving pictures, including: stream generating unit for receiving moving pictures and information inputted from a first predetermined number of cameras and generating the first predetermined number of multi-view encoded streams corresponding to the moving pictures and information; information receiving unit for receiving back channel information including viewpoint information and a display mode selected by a user; and multiplexing unit for selecting a second predetermined number of multi-view encoded streams among the first predetermined number of the multi-view encoded streams according to the back channel information and multiplexing the selected multi-view encoded streams each having the same time information, on a frame by frame basis or a field by field basis.

In accordance with another aspect of the present invention, there is also provided a method for multiplexing a multi-view three-dimensional moving pictures, including the steps of: a) receiving moving pictures and information inputted from a first predetermined number of cameras and generating the first predetermined number of multi-view encoded streams corresponding to the moving pictures and information; b) receiving back channel information including viewpoint information and a display mode selected by a user; and c) selecting a second predetermined number of multi-view encoded streams among the first predetermined number of the multi-view encoded streams according to the back channel information and multiplexing the selected multi-view encoded streams each having the same time information, on a frame by frame basis or a field by field basis.

In accordance with further another aspect of the present invention, there is also provided a computer readable recoding medium storing instructions for executing the method, including functions of: a) receiving moving pictures and information inputted from a first predetermined number of cameras and generating the first predetermined number of multi-view encoded streams corresponding to the moving pictures and information; b) receiving back channel information including viewpoint information and a display mode selected by a user; and c) selecting a second predetermined number of multi-view encoded streams among the first predetermined number of the multi-view encoded streams according to the back channel information and multiplexing the selected multi-view encoded streams each having the same time information, on a frame by frame basis or a field by field basis.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
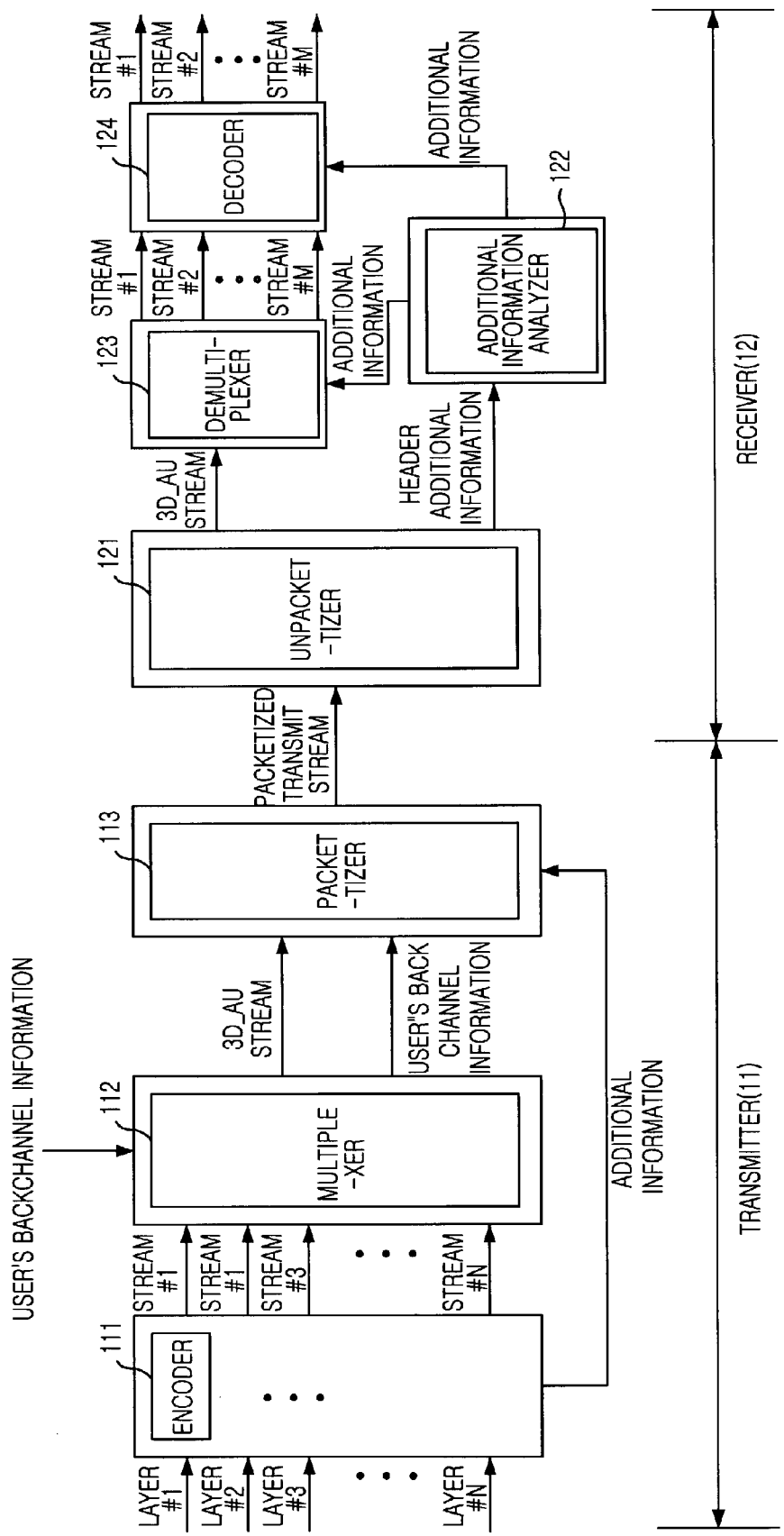
FIG. 1 is a diagram illustrating a system for processing, transmitting and receiving a multi-view three-dimensional moving picture according to user's request in accordance with a preferred embodiment of the present invention.

FIG. 1 is a diagram illustrating a transceiver for processing, transmitting and receiving a multi-view three-dimensional moving picture according to user's request in accordance with a preferred embodiment of the present invention.

Referring to FIG. 1, the transceiver includes a transmitter 11 and a receiver 12. The transmitter 11 has an encoder 111 for encoding multi-view three-dimensional moving pictures acquired by N cameras, wherein the N is natural number bigger than 0, and outputting N multi-view streams, a multiplexer 112 for receiving N multi-view streams outputted from the encoder 111, multiplexing the N multi-view streams to one 3D_AU stream and outputting the 3D_AU stream and a packetizer 113 for generating a header with additional information of N multi-view streams outputted from the encoder 111 and multiplexer 112, generating a payload with the 3D_AU stream outputted from the multiplexer 112 and packetizing the header and payload to a transmission packet.

The receiver 12 includes an unpacketizer 121 for receiving the transmission packet from the transmitter 11 and unpacketizing the transmission packet to a header and payload, a demultiplexer 123 for demultiplexing the 3D_AU stream included in the payload to multiple multi-view streams, an additional information analyzer 122 for analyzing the additional information included in the header and a decoder 125 for decoding the demultiplexed multi-view streams.

As shown in FIG. 1, the encoder 111 receives N moving pictures of N viewpoints, encodes each of the received N moving pictures to a minimum near-by unit and outputs N multi-view encoded streams such as a stream_#1, a stream_#2, . . . and a stream_#n, which represent an encoded stream of a first viewpoint, an encoded stream of a second viewpoint, . . . and an encoded stream of $N^{th}$ viewpoint.

The N multi-view encoded streams outputted from the encoder 111 are inputted to the multiplexer 112. The multiplexer 112 selects necessary multi-view encoded streams according to a display mode requested by the user and multiplexes the selected multi-view encoded streams to a 3D_AU stream, as shown in FIG. 1. The preferred embodiment of the present invention provides four display modes such as a two-dimensional display mode, a panorama display mode, a stereoscopic display mode and an auto-stereoscopic display mode. The user can select a desired display mode among the four display modes. According to the display mode selected by the user, necessary multi-view encoded streams are selected among N multi-view encoded streams for transmitting.

Therefore, it is necessary to acquire back channel information of the user for processing the three-dimensional moving pictures. The back channel information includes viewpoints and a display mode requested by the user. When the back channel information is received from the user, M multi-view encoded streams are selected according to the back channel information, wherein M is a natural number bigger than 0. The selected multi-view encoded streams are multiplexed. During multiplexing the selected multi-view encoded streams, the selected multi-view encoded streams can be multiplexed in a field or a frame by the multiplexer 112. The method for multiplexing the selected multi-view encoded streams will be minutely explained with FIG. 2 in later.

By multiplexing the selected multi-view encoded streams, a single 3D_AU stream is generated and the 3D_AU stream is inputted to the packetizer 113 for generating a transmission packet. The packetizer 113 receives the 3D_AU stream, additional information from the encoder 111 and the back channel information of the user from the multiplexer 112. The additional information includes information of encoding method of the multi-view encoded streams. The packetizer 113 generates a header by including the additional information and the back channel information of the user and generates a payload by including the 3D_AU stream. The packetizer 113 finally packetizes the header and the payload to the transmission packet.

The transmission packet is transmitted to the receiver 12. The transmission packet is unpacketized to a header and a payload in the unpacketizer 121. The header is passed to the additional information analyzer 122 for analyzing the additional information and the back channel information of the user. The payload is passed to the demultiplexer 123 for analyzing and demultiplexing the 3D_AU stream. The additional information and the back channel information of the user from the additional information analyzer 122 are necessary for demultiplexing the 3D_AU stream.

M demultiplexed streams are passed and decoded at the decoder 124. For decoding the demultiplexed streams, the additional information from the additional information analyzer 122 is required. Finally, the decoded streams are passed to a display device and outputted according to the viewpoint and the display mode requested by user.

Figure 2:
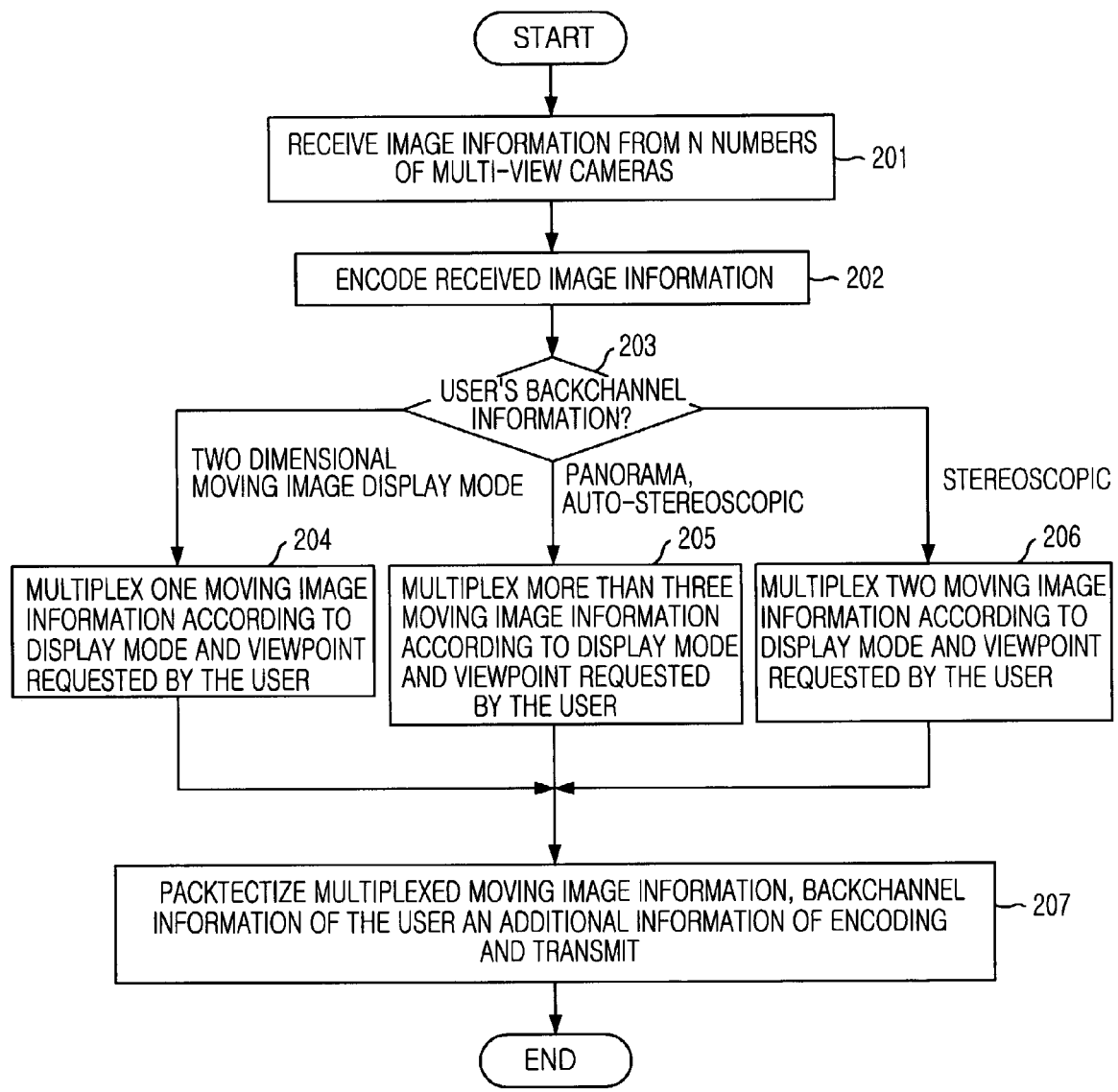
FIG. 2 is a flowchart explaining a method for multiplexing multi-view three-dimensional moving pictures according to the user's request in accordance with a preferred embodiment of the present invention.

FIG. 2 is a flowchart explaining a method for multiplexing multi-view three-dimensional moving pictures according to a display mode selected by a user in accordance with a preferred embodiment of the present invention.

For implementing the preferred embodiment of the present invention, several assumptions of an environment are required. At first, input data of the preferred embodiment are data streams of three-dimensional moving pictures inputted from a plurality of cameras. For providing the data streams of three-dimensional moving pictures, at least two cameras are required.

Cameras are arranged for capturing three-dimensional moving pictures and it is distinguished with a camera arrangement for capturing two-dimensional moving pictures. For implementing the preferred embodiment of the present invention in order to support a two-dimensional display mode and a three-dimensional display mode, calibration information of each camera should be identical and cameras should be arranged with a difference of 65 mm.

The method for multiplexing multi-view three-dimensional moving pictures in accordance with the present invention requires viewpoint information and a display mode requested by a user since the present invention uses different method for multiplexing the multi-view three-dimensional moving pictures according to back channel information including the viewpoint information and the display mode requested from the user.

The user can select the display mode among four display modes and the viewpoint among N numbers of viewpoints. For example, if the user wants to see two dimension moving pictures, then the user should select a two-dimensional display mode and a desired viewpoint among N numbers of viewpoints. After selecting the display mode and the viewpoints, the moving pictures of selected viewpoints will be displayed on a display device after processing the moving pictures with appropriate methods according to the selected viewpoints and the display mode. That is, if the user wants the two-dimensional moving pictures, only necessary moving pictures are selected among moving pictures inputted from the plurality of cameras and the selected moving pictures are processed for displaying on a display device. Therefore, the user cannot see other sides of the moving pictures by turning the displayed images as like as three-dimensional computer graphic (CG).

The present invention provides four display modes including a two-dimensional display mode, a panorama display mode, a stereoscopic display mode and an auto stereoscopic display mode. According to the display mode selected by the user, moving pictures of the viewpoints are differently processed. A method for processing the moving pictures according to each display mode will be explained in detail as follows At first, the two-dimensional display mode is a conventional moving picture display mode. If the user selects the two-dimensional display mode, moving pictures of the selected viewpoint, which are moving pictures inputted from only one camera, are multiplexed and transmitted to a receiver.

Secondly, the panorama display mode requires the moving pictures of more than two viewpoints. That is, moving pictures of more than two viewpoints are provided to the user. For example, in case that the user selects the panorama display mode and desired viewpoints such as first, third and fifth viewpoints, encoded streams of the first, third and fifth viewpoints are multiplexed to a 3D_AU stream and the 3D_AU stream is transmitted to a receiver. After processing the 3D_AU stream at the receiver side, the user is able to see the moving pictures of the first, third and fifth viewpoints. Therefore, it is a display mode that provides wider view of the moving picture.

Third, the stereoscopic display mode is a mode for displaying three-dimensional moving pictures of two viewpoints acquired by two cameras. That is, in case that the user selects the stereoscopic display mode and desired viewpoints such as a first and a second viewpoints or a third and a fourth viewpoints, encoded streams of the selected viewpoints are multiplexed to a single 3D_AU stream and transmitted to a receiver. The transmitted 3d_AU stream is decoded and displayed on a display device.

In the above-mentioned stereoscopic display mode, an arrangement of cameras is a critical factor. For implementing the preferred embodiment for supporting the stereoscopic display mode, following assumptions are required.

At first, there is a certain set of cameras that provides a moving picture as a stereo. When the user selects the viewpoints, it assumes that the user knows a pair of camera that supports the stereo. The user should select the viewpoints among the pair of camera that supports the stereo. For example, if the user selects a first viewpoint, then a second viewpoint should be selected and encoded streams of the first viewpoint and the second viewpoint are multiplexed to a single 3D_AU stream. The 3D_AU stream is transmitted to a receiver.

The auto-stereoscopic display mode is a display mode combining the panorama display mode and the stereoscopic display mode.

The same assumptions of the stereoscopic display mode need to be implemented to the auto-stereoscopic display mode for selecting the viewpoints. That is, the user should select a certain set of viewpoints providing the moving pictures as the stereo. And the moving picture of each viewpoint is provided as the panorama display mode. For example, if the user selects a first viewpoint, a second viewpoint and a third viewpoint, then the first viewpoint and the second viewpoint should be provide the moving pictures as the stereo and the second viewpoint and the third viewpoint should provide the moving pictures as the stereo. And the moving pictures of each viewpoint are provided as the panorama display mode. Therefore, it is a display mode providing a three-dimensional view and a wider view of the moving pictures.

In the auto-stereoscopic display mode, the method for multiplexing the multi-view three-dimensional moving pictures of the panorama display mode is used since the moving pictures of three viewpoints should be multiplexed.

Referring to FIG. 2 and the above-mentioned assumptions, the method for multiplexing the multi-view three-dimensional moving pictures according to a display mode selected by user in accordance with the present invention is explained in detail as follows.

The multi-view moving pictures from N multi-view cameras are inputted at a step 201.

The received multi-view moving pictures from the N cameras are encoded to each minimum near-by unit and N multi-view encoded streams are generated at a step 202, wherein the N multi-view encoded streams include a first viewpoint's multi-view encoded stream, a second viewpoint's multi-view encoded stream, . . . , $N^{th}$ viewpoint's multi-view encoded stream.

At a step of 203, back channel information of a user is analyzed for detecting a display mode and viewpoints selected by the user.

According to a result of the step 203, multi-view encoded streams corresponding to the viewpoints detected from the back channel information are selected among N multi-view encoded streams and the selected multi-view encoded streams are multiplexed according to the display mode selected by the user at steps 204, 205 and 206. For example, if the user requests the two-dimensional display mode at the step 203, one encoded stream corresponding to a viewpoint requested by the user is multiplexed at the step 204. If the user requests the panorama display mode or the auto-stereoscopic display mode at the step 203, three encoded streams corresponding to viewpoints selected by the user are multiplexed at the step 205 and if the user requests the stereoscopic display mode at the step 203, two encoded streams corresponding to viewpoints selected by the user are multiplexed at the step 206.

After multiplexing the multi-view encoded streams corresponding to the viewpoints selected by the user, the multiplexed stream is packetized with additional information of an encoding method and the user's back channel information to a transmission packet and the transmission packet is transmitted at a step 207.

Figure 3:
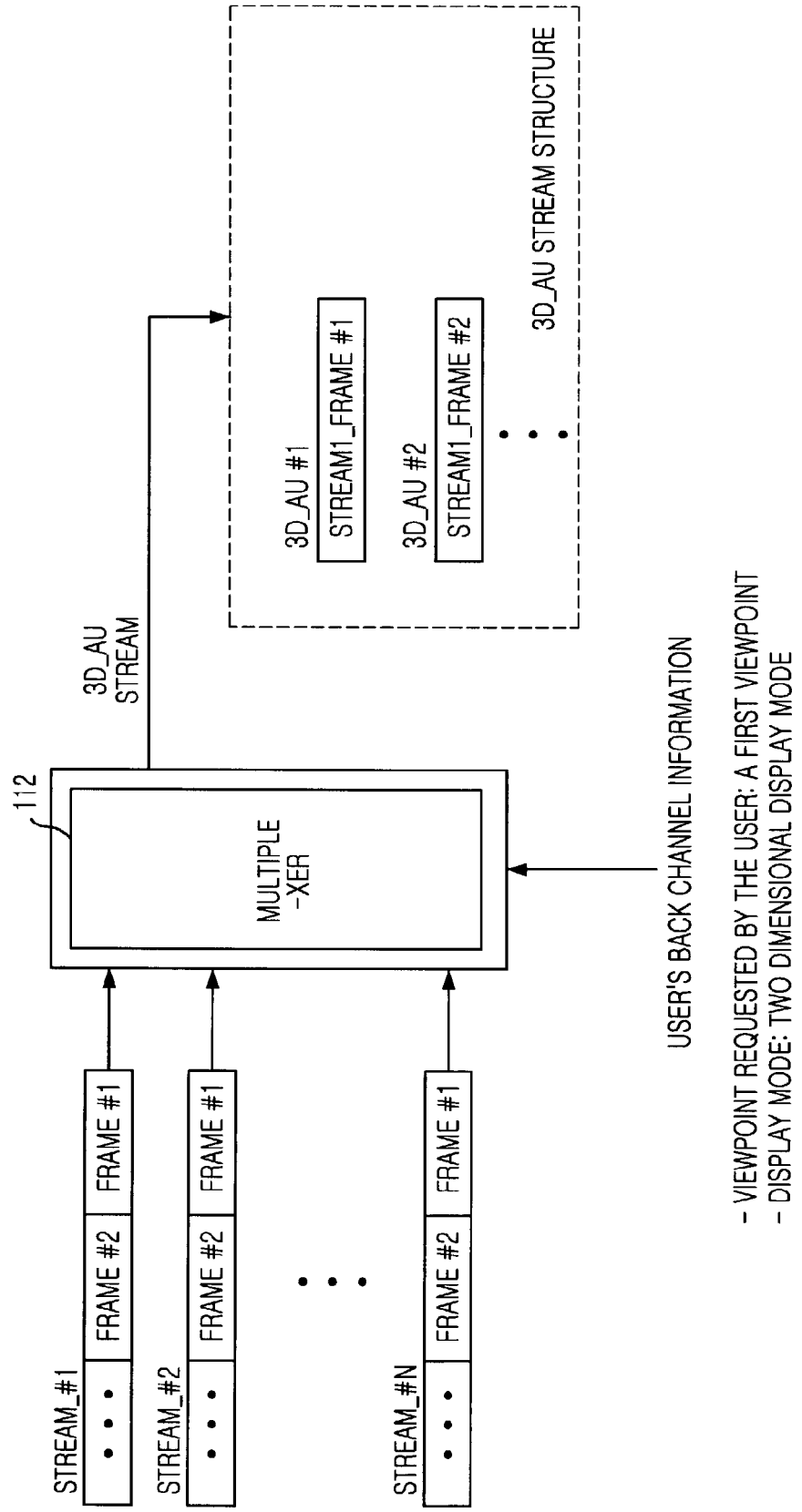
FIG. 3 is a diagram illustrating the method for multiplexing moving pictures in case of a two-dimensional display mode in accordance with the present invention.
Figure 4:
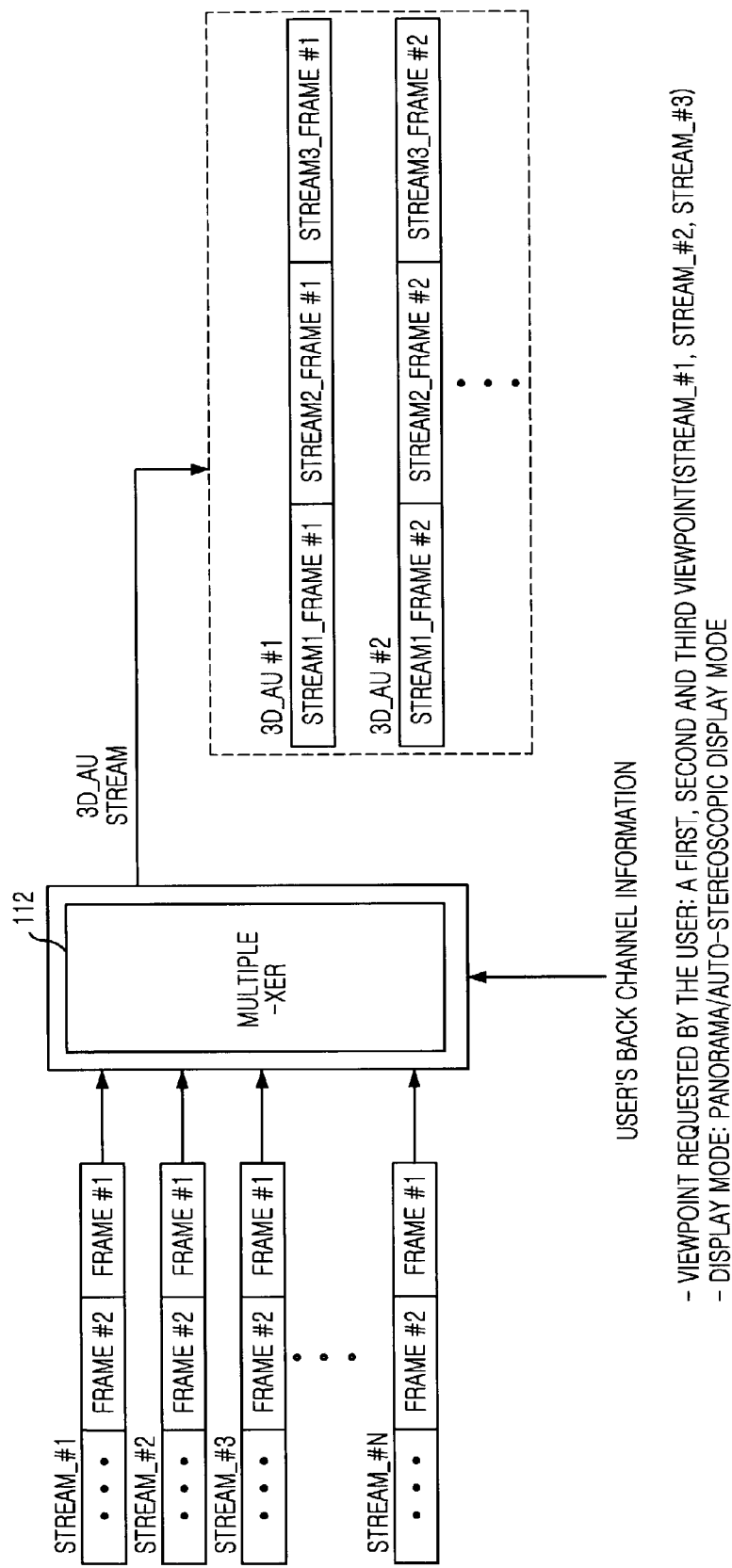
FIG. 4 is a diagram illustrating the method for multiplexing moving pictures in case of a panorama display mode or an auto-stereoscopic display mode in accordance with the present invention.
Figure 5:
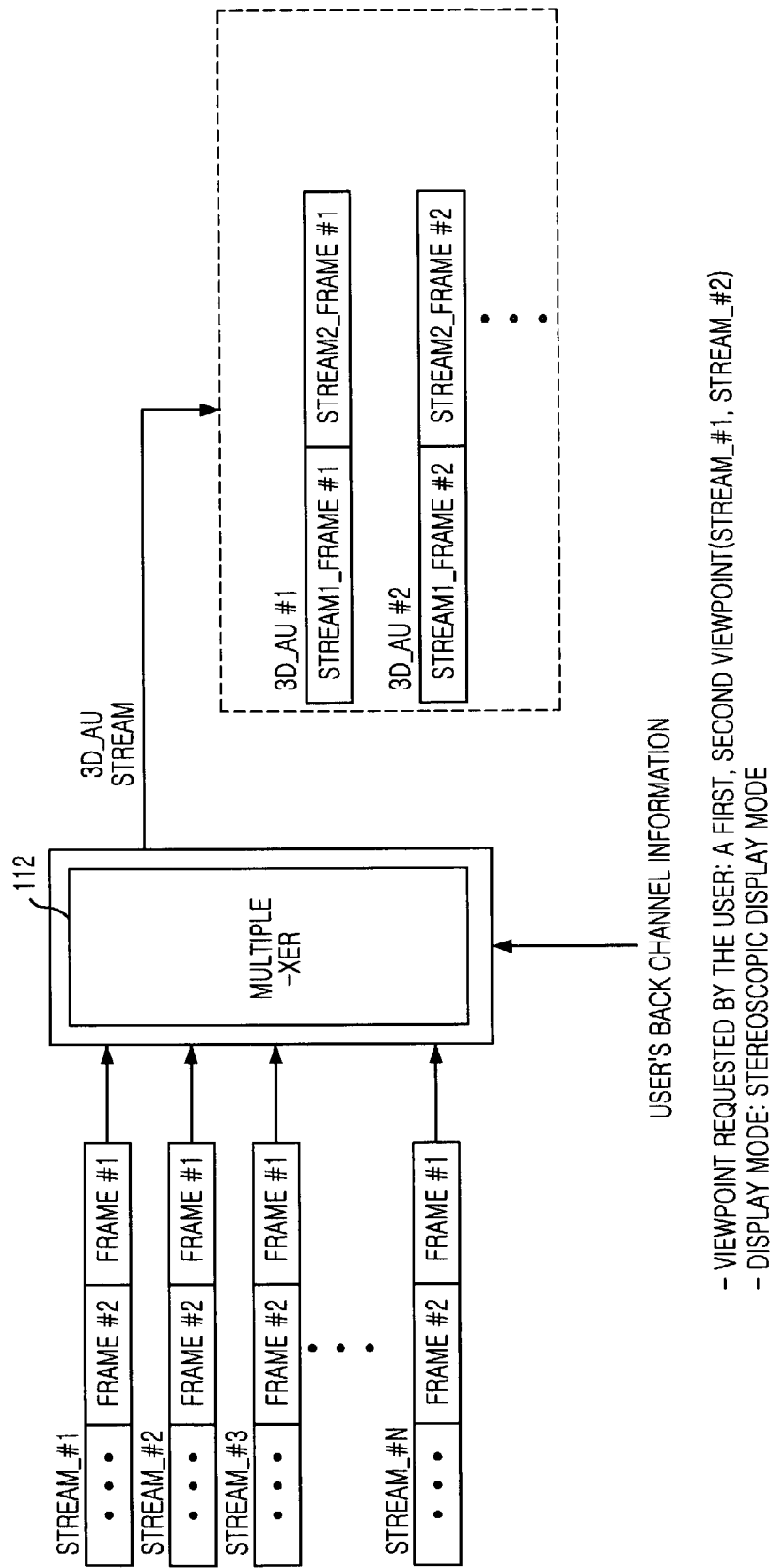
FIG. 5 is a diagram illustrating a method for multiplexing moving pictures in case of the stereoscopic display mode in accordance with a preferred embodiment of the present invention.

FIGS. 3, 4 and 5 are a diagram explaining a method for multiplexing three-dimensional moving pictures according to the display mode requested from the user.

FIG. 3 is a diagram illustrating the method for multiplexing three-dimensional moving pictures in a case of a two-dimensional display mode.

Referring to FIG. 3, if the user requests the two-dimensional display mode, one encoded stream is selected according to a viewpoint requested from the user among received N numbers of encoded streams and the selected stream is multiplexed to a 3D_AU stream.

Each encoded stream includes multiple numbers of frames and each frame is multiplexed to the 3D_AU stream.

FIG. 4 is a diagram illustrating a method for multiplexing three-dimensional moving pictures in a case of a panorama display mode or an auto-stereoscopic display mode.

Referring to FIG. 4, if the user requests the panorama display mode or the auto-stereoscopic display mode, multi-view encoded streams of a first viewpoint, a second viewpoint and a third viewpoint, which are requested from the user, are selected among the received N multi-view encoded streams and the selected multi-view encoded streams are multiplexed to a single 3D_AU stream.

That is, multi-view encoded streams of the three viewpoints selected by the user are orderly united and composed to the single 3D_AU stream and outputted. In other words, the selected encoded streams having L numbers of frames are multiplexed to the 3D_AU stream by orderly multiplexing frames of selected three encoded streams to one frame.

For transmitting the 3D_AU stream at the transmitter, additional information of only one encoded stream is used. Therefore, unnecessary packet header can be eliminated, and efficiency of transmission increases.

The same method for multiplexing the multi-view three-dimensional moving picture is required in both of the panorama display mode and the auto-stereoscopic display mode; however, a method for demultiplexing the received 3D_AU stream is not same in the panorama display mode and the auto-stereoscopic display mode.

FIG. 5 is a diagram illustrating a method for multiplexing multi-view three-dimensional moving pictures in a case of a stereoscopic display mode in accordance with the present invention.

Referring to FIG. 5, if the user requests the stereoscopic display mode and viewpoints of a first and second, encoded streams of the first viewpoint and the second viewpoint among the received N multi-view encoded streams are multiplexed to a 3D_AU stream.

That is, multi-view encoded streams of two viewpoints are orderly united and composed to the single 3D_AU stream and outputted. In other words, the selected encoded streams having L numbers of frames are multiplexed to the 3D_AU stream by orderly multiplexing frames of selected two encoded streams to one frame.

In a receiver, a received 3D_AU stream is demultiplexed to multi-view encoded streams and the multi-view encoded streams should be decoded for displaying moving pictures on a display device. For decoding the multi-view encoded stream at the receiver, information of encoding method is required. Therefore, the packetizer packetizes the necessary information for decoding into a header by receiving additional information from the encoder and back channel information of user from the multiplexer.

As mentioned above, by multiplexing multi-view encoded streams having identical time information to one basis stream, a synchronizing process of multi-view encoded streams can be simplified. Moreover, eliminating overlapped header information increases efficiency of transmission. Time information in an encoded stream of single viewpoint is acquired and used for processing all other encoded streams. Therefore, overlapped header information can be eliminated.

Figure 6:
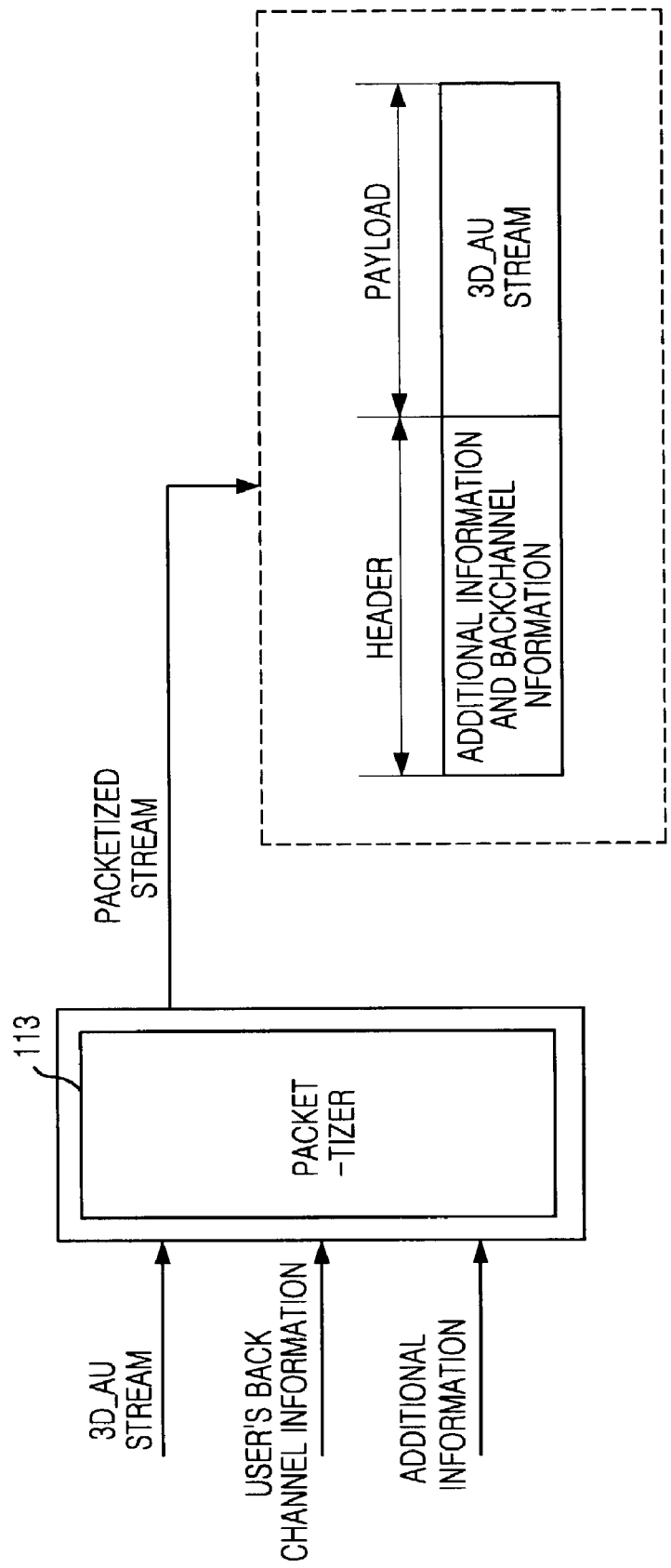
FIG. 6 is a diagram showing a packetized transmit stream in accordance with a preferred embodiment of the present invention.

FIG. 6 is a diagram showing a transmission packet in accordance with a preferred embodiment of the present invention.

Referring to FIG. 6, a packetizer 113 packetizes additional information for an encoding method, a user's back channel information and a 3D_AU stream to a transmission packet and the transmission packet is transmitted to a receiver.

The transmission packet includes a header and a payload. The header contains the additional information for an encoding method and the back channel information of the user. The payload contains the 3D_AU stream.

The transmission packet is transmitted to the receiver and unpacketized to the header and the payload by an unpacketizer at the receiver. The header is passed to an additional information analyzer for analyzing the additional information and the back channel information of the user. The 3D_AU stream included in the payload is demultiplexed at a demultiplexer. For demultiplexing, the additional information and the back channel information from the additional information analyzer is required.

The demultiplexed M encoded streams are passed to the decoder and decoded by using the additional information included in the header. The decoded streams are passed to a display device and displayed according to the display mode and the viewpoints requested from the user.

The above-mentioned method according to the present invention can be implemented as instructions and stored to a computer readable recoding medium such as a CD-ROM, RAM, floppy disk, hard disk and optical magnetic disk.

The present invention can effectively synchronize multi-view three-dimensional moving pictures according to four types of display mode.

The present invention can process the multi-view three-dimensional moving pictures according to the display mode and system environment requested by the user.

The present invention can simplify a synchronization-process by multiplexing multi-view encoded streams having identical time information to one basis stream and minimize overlapped header information by using time information acquired from an encoded stream of one viewpoint to synchronize encoded streams of all remained viewpoints.

The present invention also increases an efficiency of transmission by streaming only data adaptable to the display mode selected by the user and an environment of a system while maintaining the comparability of a conventional system.

While the present invention has been described with respect to certain preferred embodiments, it will be apparent to those skilled in the art that various changes and modifications may be made without departing from the scope of the invention as defined in the following claims.

What is claimed is:

1. An apparatus for multiplexing multi-view three-dimensional moving pictures, comprising:

a stream generator for receiving moving pictures and information inputted from a first predetermined number of cameras and generating the first predetermined number of multi-view encoded streams corresponding to the moving pictures and information;

an information receiver for receiving back channel information including viewpoint information and a display mode selected by a user;

a multiplexor for selecting a second predetermined number of multi-view encoded streams among the first predetermined number of the multi-view encoded streams according to the back channel information and multiplexing the selected multi-view encoded streams each having the same time information, on a frame by frame basis or a field by field basis; and a packetizer for generating a packet having a header and a payload and transmitting the packet, wherein the header includes the back channel information and additional information, which contains information of encoding method of the multi-view encoded streams generated in the stream generator, and the payload includes the multiplexed multi-view encoded stream.

2. The apparatus as recited in claim 1, wherein the display mode includes a two-dimensional display mode, a panorama display mode, a stereoscopic display mode and an auto-stereoscopic display mode.

3. A method for multiplexing multi-view three-dimensional moving pictures, comprising the steps of:
  a) receiving moving pictures and information inputted from a first predetermined number of cameras and generating the first predetermined number of multi-view encoded streams corresponding to the moving pictures and information;
  b) receiving back channel information including viewpoint information and a display mode selected by a user;
  c) selecting a second predetermined number of multi-view encoded streams among the first predetermined number of the multi-view encoded streams according to the back channel information and multiplexing the selected multi-view encoded streams each having the same time information, on a frame by frame basis or a field by field basis; and
  d) generating a packet having a header and a payload and transmitting the packet, wherein the header includes the back channel information and additional information, which contains information of encoding method of the multi-view encoded streams generated in the step a), and the payload includes the multiplexed multi-view encoded stream.

4. The method as recited in claim 3 wherein the display mode includes a two-dimensional display mode, a panorama display mode, a stereoscopic display mode and an auto-stereoscopic display mode.

5. The method as recited in claim 4, wherein if the two-dimensional display mode is selected, a multi-view encoded stream of one viewpoint selected by a user is multiplexed and transmitted.

6. The method as recited in claim 4, wherein if the panorama display mode is selected, multi-view encoded streams of two or more viewpoints selected by the user are multiplexed and transmitted.

7. The method as recited in claim 4, wherein if the stereoscopic display mode is selected, multi-view encoded streams of two viewpoints selected by the user are multiplexed and transmitted.

8. The method as recited in claim 4, wherein if the auto-stereoscopic display mode is selected, multi-view encoded streams of two or more viewpoints selected by the user are multiplexed and transmitted.

9. The method as recited in claim 4, wherein the header is generated by using only one among lots of additional information of multi-view encoded streams selected for multiplexing.

10. A computer readable recording medium storing instructions for executing a method for multiplexing multi-view three-dimensional moving pictures, comprising functions of:
  a) receiving moving pictures and information inputted from a first predetermined number of cameras and generating the first predetermined number of multi-view encoded streams corresponding to the moving pictures and information;
  b) receiving back channel information including viewpoint information and a display mode selected by a user;
  c) selecting a second predetermined number of multi-view encoded streams among the first predetermined number of the multi-view encoded streams according to the back channel information and multiplexing the selected multi-view encoded streams each having the same time information, on a frame by frame basis or a field by field basis; and
  d) generating a packet having a header and a payload and transmitting the packet, wherein the header includes the back channel information and additional information, which contains information of encoding method of the multi-view encoded streams generated in the step a), and the payload includes the multiplexed multi-view encoded stream.

* * * * *